INVENTOR
CLEMENS B. HOPPE

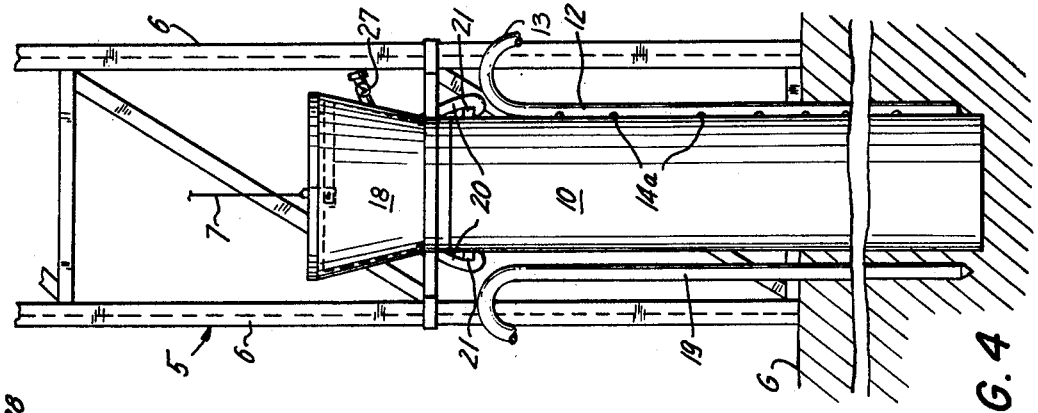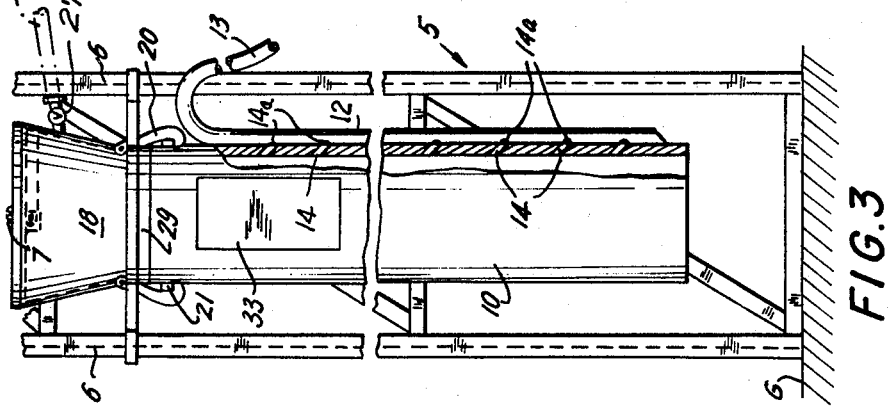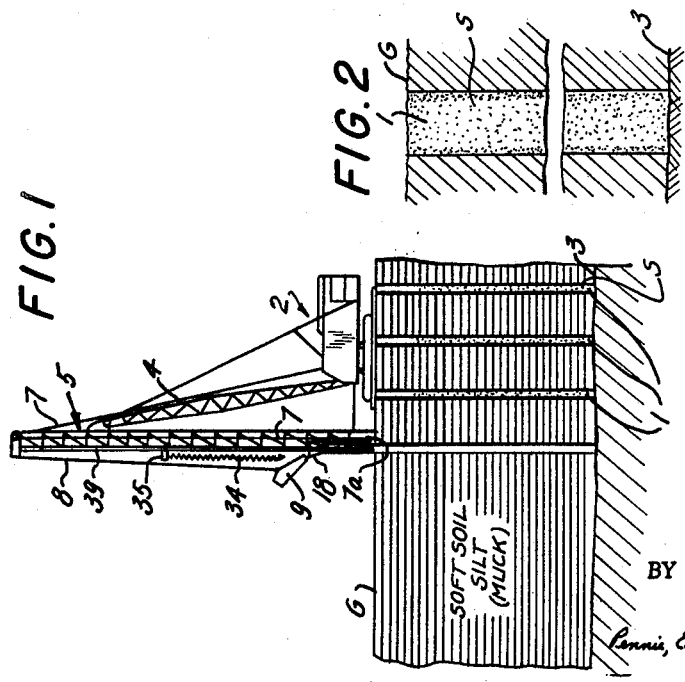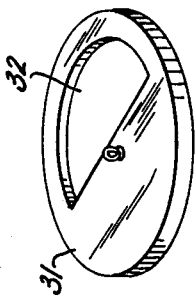

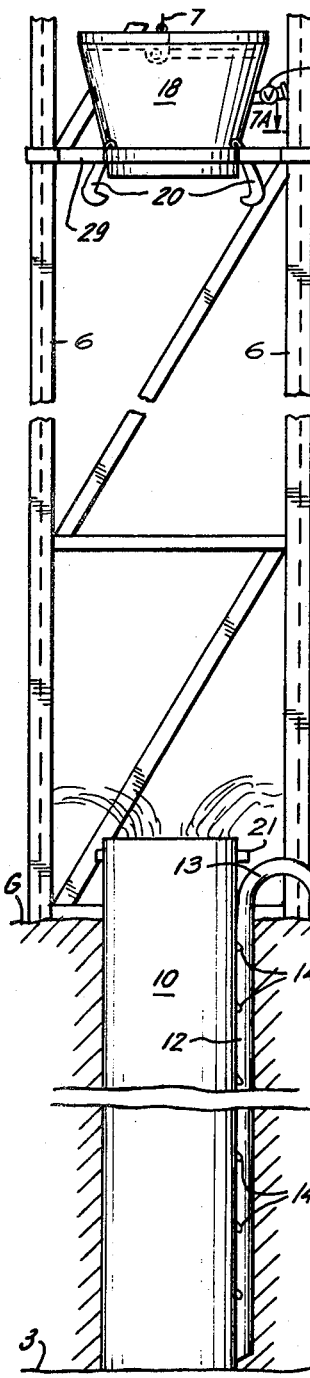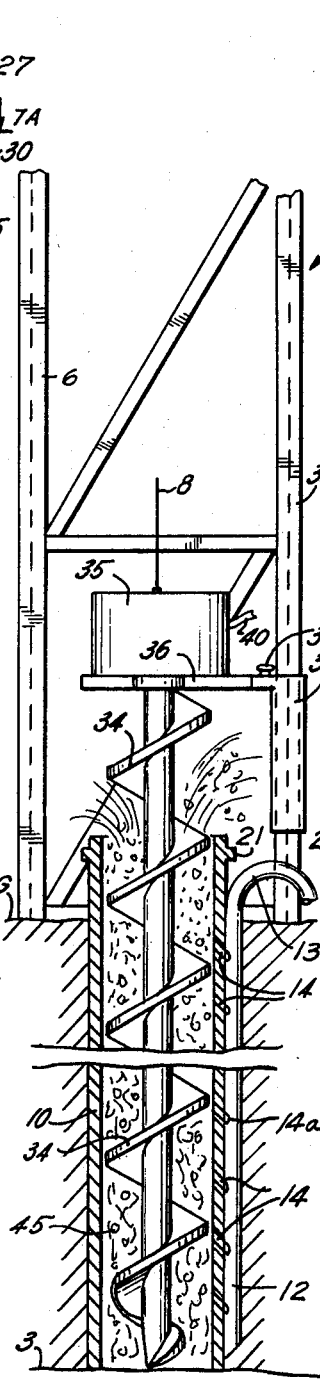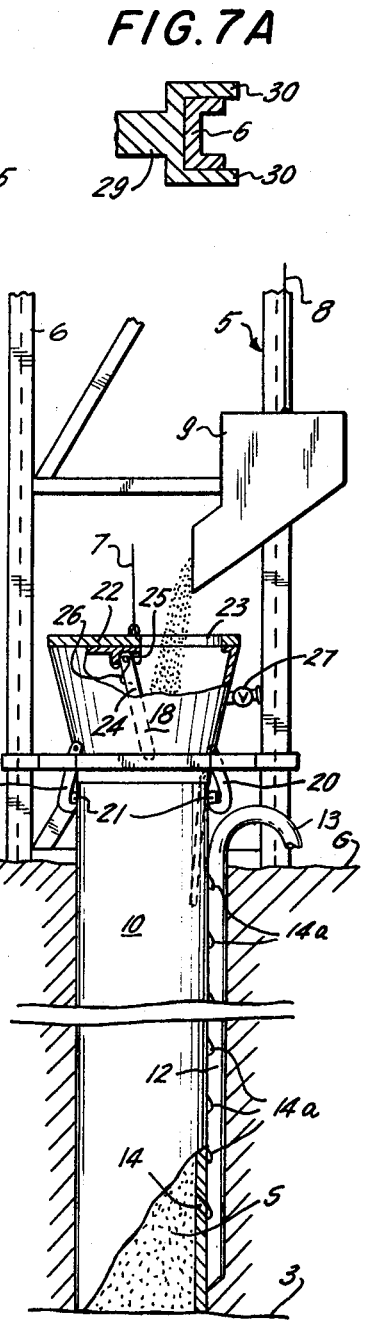

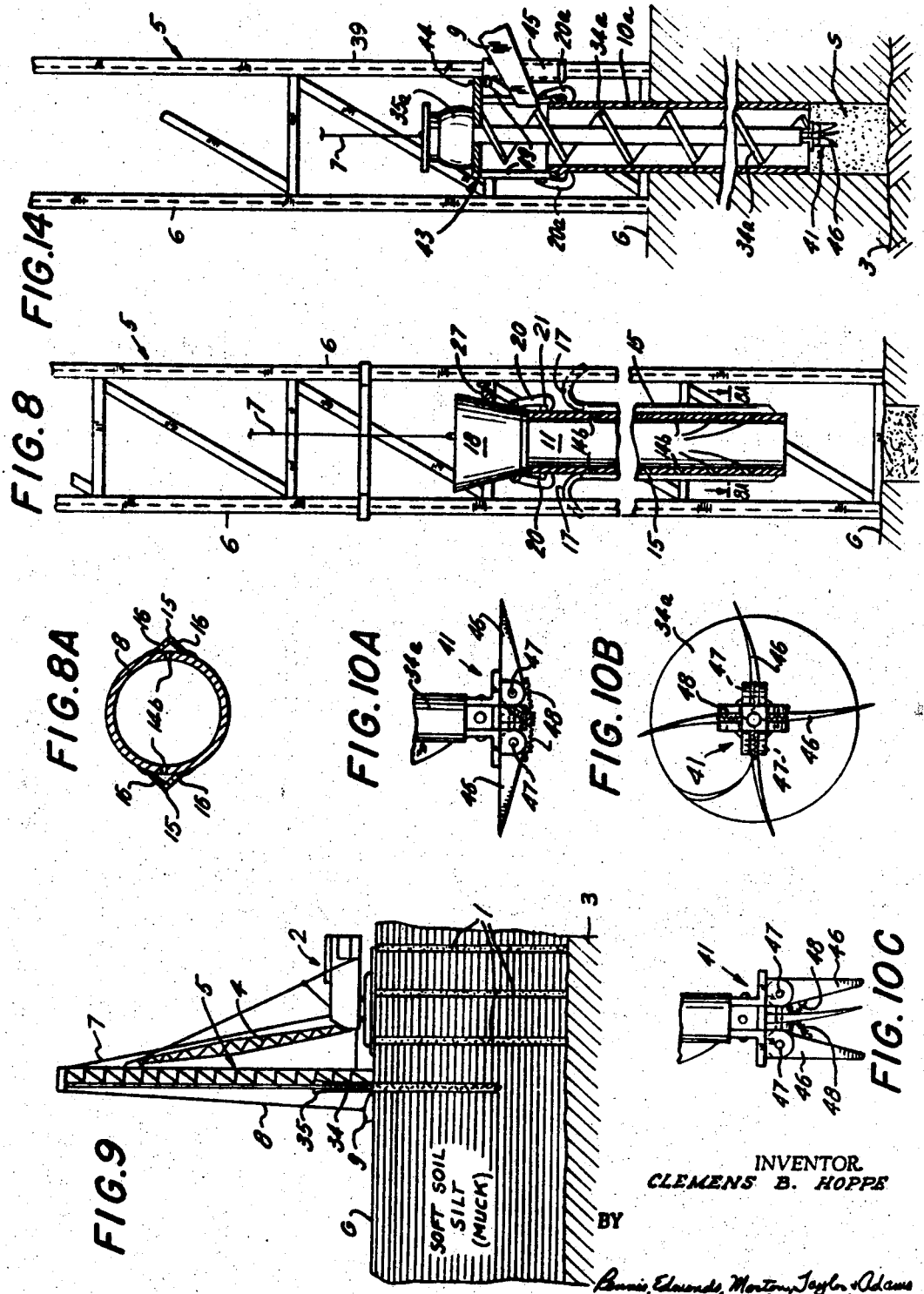

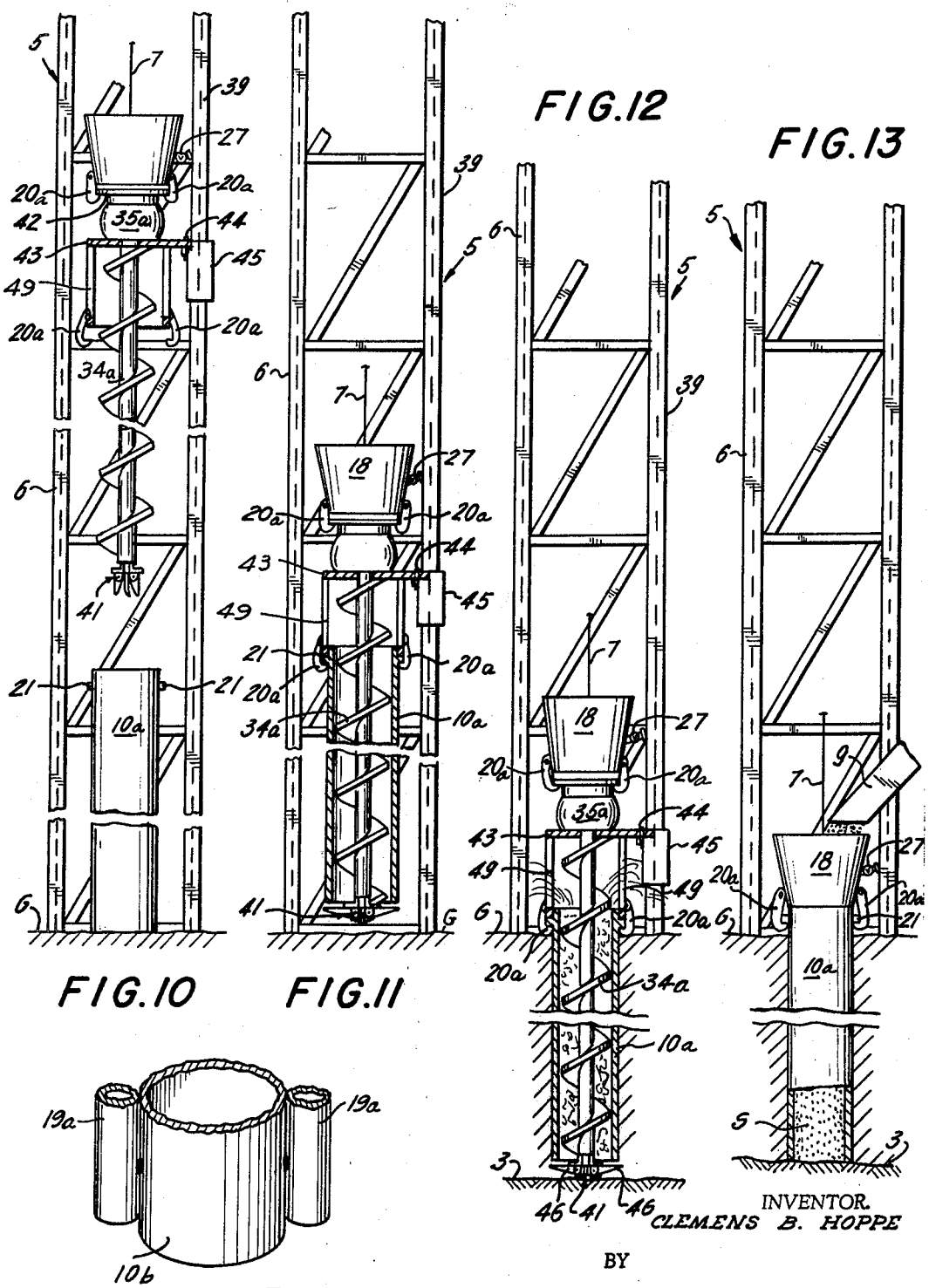

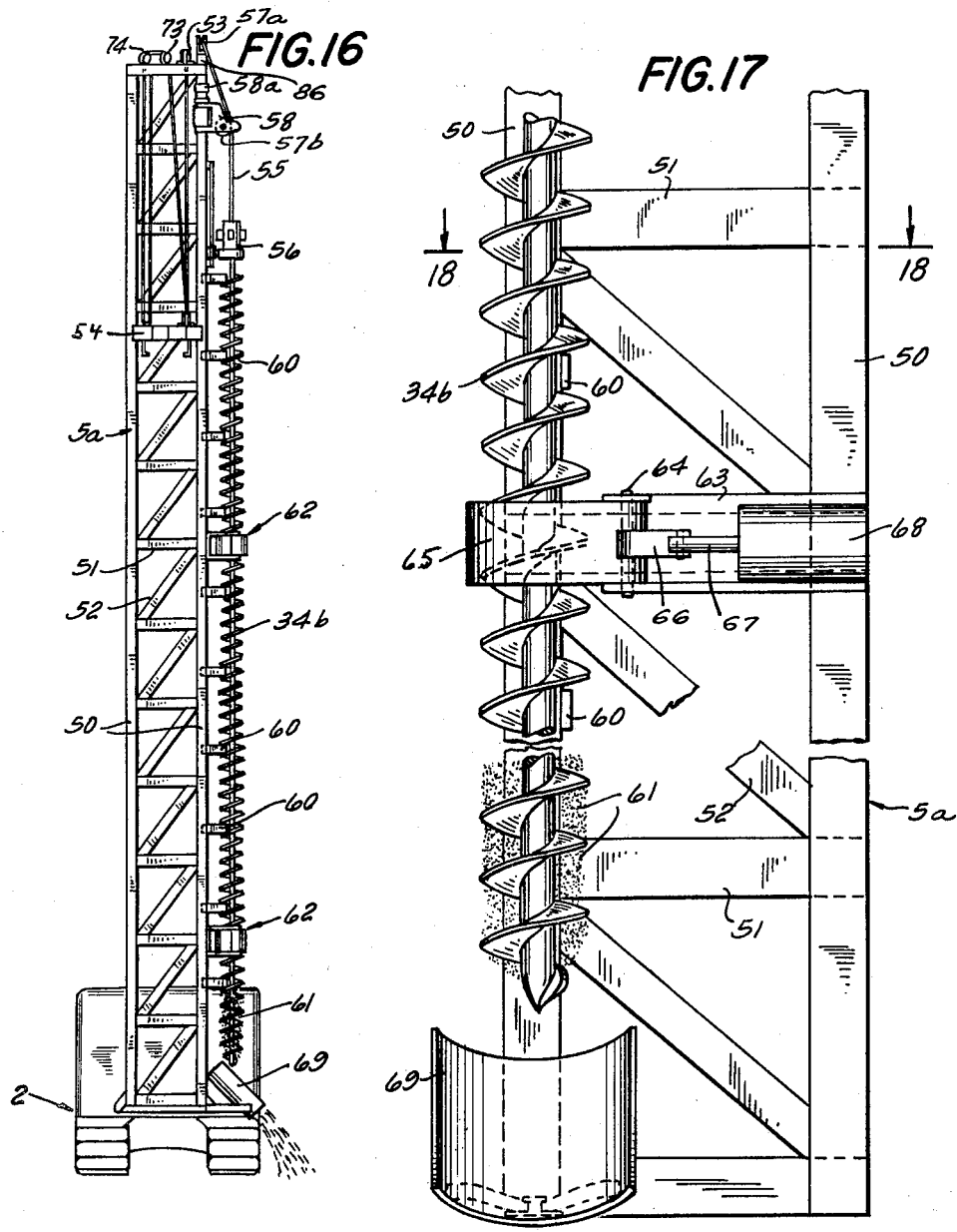

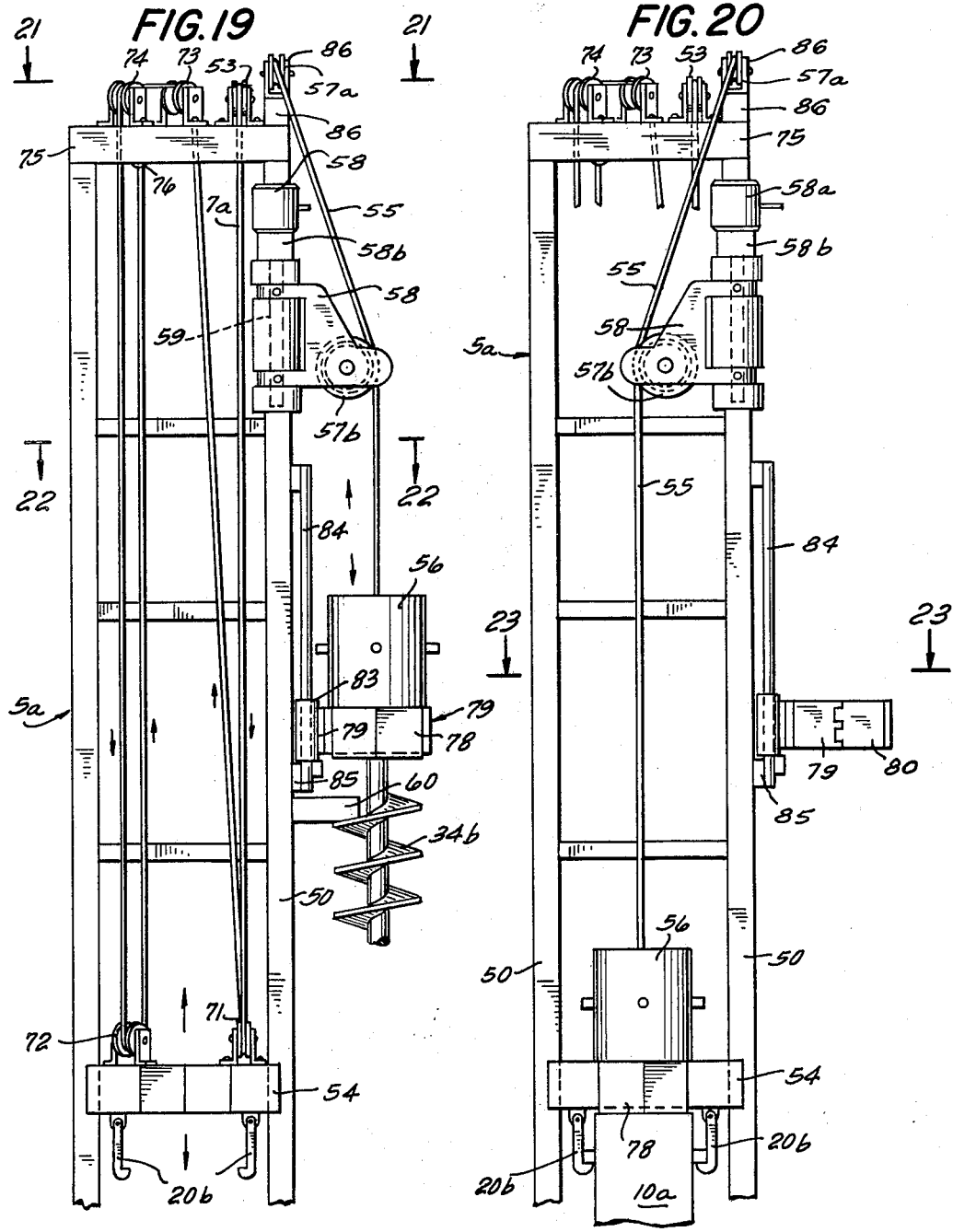

Nov. 18, 1969  C. B. HOPPE  3,478,524
APPARATUS FOR INSTALLING NONDISPLACEMENT SAND DRAINS
Filed March 26, 1968  10 Sheets-Sheet 8

INVENTOR
CLEMENS B. HOPPE
BY
Pennie, Edmonds, Morton, Taylor Adams
ATTORNEYS

Nov. 18, 1969  C. B. HOPPE  3,478,524
APPARATUS FOR INSTALLING NONDISPLACEMENT SAND DRAINS
Filed March 26, 1968  10 Sheets-Sheet 9
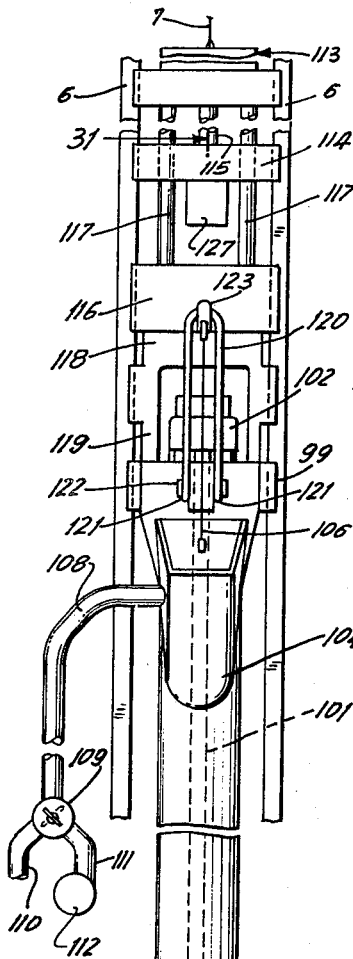
FIG.29
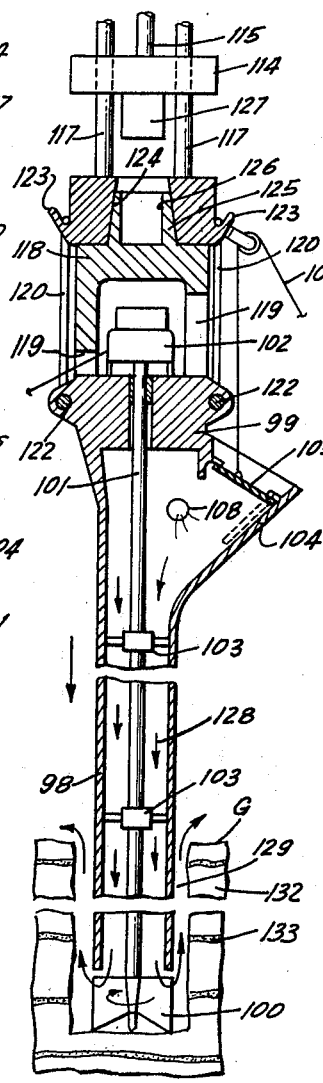
FIG.31
FIG.30
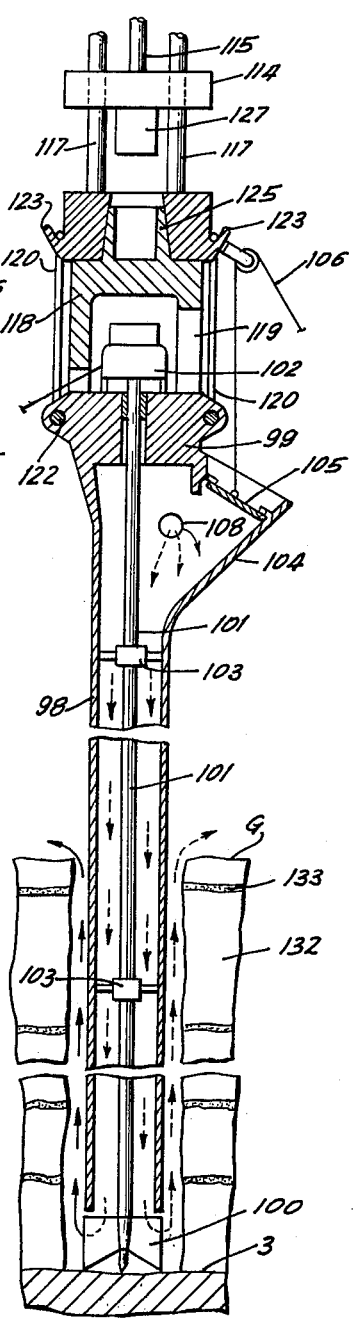
FIG.32
INVENTOR
CLEMENS B. HOPPE
BY
Pennie, Edmonds, Morton, Taylor & Adams
ATTORNEYS Nov. 18, 1969  C. B. HOPPE  3,478,524
APPARATUS FOR INSTALLING NONDISPLACEMENT SAND DRAINS
Filed March 26, 1968  10 Sheets-Sheet 10

INVENTOR
CLEMENS B. HOPPE
BY
Pennie, Edmonds, Morton, Taylor & Adams
ATTORNEYS

United States Patent Office 3,478,524
Patented Nov. 18, 1969

3,478,524
APPARATUS FOR INSTALLING NONDISPLACE-
MENT SAND DRAINS
Clemens B. Hoppe, Box 590, Palm Beach, Fla. 33480
Continuation-in-part of application Ser. No. 477,366,
Aug. 5, 1965. This application Mar. 26, 1968, Ser.
No. 719,821
Int. Cl. E02d 5/22, 5/46; E21d 1/08
U.S. Cl. 61—63   20 Claims

ABSTRACT OF THE DISCLOSURE

Installation of columns of sand in soft unstable soil for the purpose of strengthening or stabilizing the soil sufficiently to support highways, buildings etc.

Cross references to related applications

This application is a continuation-in-part of my prior application S.N. 477,366 filed Aug. 5, 1965.

Background of invention

Certain ground areas such as those of a swampy nature have so much water mixed with the soil that even though the ground surface may not be covered with a layer of water, the surface does not have sufficient strength to support any substantial amount of weight. Unstable soil areas of this sort are encountered in the design and construction of highways, airports, earth dam, and pier facilities. To stabilize these areas having soils of low shear strength and high water content, usually consisting of muck composed of soft clays, silt and the like, the installation of vertical sand drains is cheaper, and often quicker, than other stabilizing methods.

Sand drains consist of vertical columns of sand from 12" to 20" in diameter and spaced on centers from 6' to 20' apart, dependent upon the degree of permeability of the soil encountered. There are, in general, two methods of installing these columns of sand. One is by sinking into the soil a shell or casing having a pivoted closure plug at its lower end, filling it with sand and then withdrawing the casing, the plug opening automatically to allow the sand to discharge. The forcing of the casing into the muck displaces the soil or mud at the sides of the casing, and such displacement of this mud, which is of a thixotropic nature, has been found to largely destroy whatever initial supporting strength the soil may have had.

The second method of installing sand drains is to work into the soil an empty casing of the desired diameter which is open at its bottom end so that the soil is not displaced laterally but is merely enclosed within the casing. After the casing has been sunk to the desired depth, varying from 25' to some 135', depending on the soil conditions, the soil which has been enclosed within the casing, and which is referred to as "spoil," is removed from the casing and the casing then filled with sand, after which the casing is withdrawn to be used for installing another sand drain. This leaves a column of sand in the unstable soil, and the soil surrounding it has not been displaced or disturbed, so that its original supporting strength has been conserved.

Brief summary of the invention

The present invention relates to the installation of the non-displacement type of sand drain where the adjacent soil is not disturbed during installation.

There is a problem in sinking the casing, that is, working it into the soft soil until firm ground is reached, and there are also problems in removing the soil material or spoil from within the sunken casing and in placing the sand at the bottom of the casing. In accordance with my present invention I have devised a special form of casing including specially arranged jet openings through its wall, and air, water, or a combination of air and water, as the circumstances may require, is supplied to these jet openings under appropriate pressure. This may be done by means of one or more hose connections at the upper end of the casing. With this specially constructed casing, after it has been sunk, the clearing out operation is easily accomplished.

The jet openings are arranged in a continuous series lengthwise of the casing, and advantageously several such series or groups of jet openings are employed. These groups are separate from one another, one group being disposed near the top of the casing, another group near the bottom, and there are as many intermediate groups as required by the length of the casing. A separate conduit extending to the top of the casing is provided for each group.

The casing comprises a tubular steel shell of suitable thickness to which one or more fluid conduits are applied to the outside surface of the casing by welding or otherwise and which extend lenthwise thereof. This fluid conduit may be made in various ways. For example, it may consists of a steel pipe welded to the surface of the casing, or it may consist of a rolled steel angle section having equal length sides, the edges of which are welded continuously to the surface of the casing. Jet passages are drilled, or otherwise formed, which pierce the wall of the casing and communicate with the fluid conduit. These jet passages are directed upwardly toward the interior of the casing at a suitable angle to the horizontal. The jets of fluid issuing from these passages serve to agitate and drive the spoil to the upper end of the casing at the surface of the ground.

Advantageously two sets of jets are arranged on opposite sides of the casing so that the spoil is urged upwardly towards the center of the casing from both sides. When several groups of jet openings are provided in the casing it is also desirable to arrange a part of each group on each side of the casing for the same reason.

Where the soft soil in which the casing is to be sunk provides a resistance greater than can be overcome by the weight of the casing itself, I may employ a special form of device which will be referred to as a pressure chamber, or I may employ a pile hammer. The pressure chamber is a heavy iron or steel casing in the general shape of an inverted truncated cone, the lower end of which is of about the same diameter as the casing. It is releasably secured to the top of the casing, for example, by a plurality of pivoted latch members that are adapted to engage shoulder surfaces provided on the outside of the casing near the top thereof. Also a suitable packing ring produces an air-tight joint between the pressure chamber and the casing.

The pressure chamber has a flat top which is integral with or tightly secured to the side walls but which has an opening therein of a size sufficient for the introduction of sand. This opening is closed by a springloaded door which is pivoted on the inside of the top wall and forms an air-tight seal with the inside surface of the wall.

The pressure chamber is also provided with a connection for an air hose so that after the casing has been sunk and sand introduced through the door of the pressure chamber, air under suitable pressure can be admitted to the casing to force the sand to and out of the bottom of the casing.

The pressure chamber with the casing releasably connected thereto by the latch members is lowered under the control of the hoist line of a crane equipped with an upright guide and control member referred to as a "leads" which is pivoted to the boom of the crane. Inasmuch as the pressure chamber weighs in the neighborhood of half a ton, the addition of this weight to that of the casing itself is usually sufficient in soil where sand drains are to be installed, to sink the casing into the soft soil. Where the casing cannot be sunk by weight alone the pile hammer may be used or the pull of the hoist line may be applied downwardly to the casing. Also an electromagnetic vibrator may be secured to the side of the casing near its upper end, and the rapid vibrations of such a device assist in working the lower end of the casing down to firm ground.

Under conditions where it is not desired to use jets for removing the spoil, I provide for the use of an auger assembly equipped at its upper end with a power driving unit. Such assembly slides on an auxiliary guide on the leads, and when it is desired to use the auger for removing the soil, it is swung into position within the leads and lowered into the casing.

Further in accordance with my present invention, where it is desired to use an ordinary tubular casing instead of one of the special forms described above, I provide a specially arranged power driven auger assembly which is releasably connected to the pressure chamber. The auger has at its lower end an automatically expanding and contracting bit or head. In sinking the casing, the auger is inserted in the casing with the bit projecting from its lower end. The arrangement is such that when the auger is rotated by the power unit at operating speed, the tips of the bit members project somewhat beyond the surface of the casing so that a hole is drilled into which the casing readily descends, particularly with the aid of the weight of the pressure chamber.

After the casing has been sunk to the desired depth the rotation of the auger is continued until most of the spoil has been removed. The auger is then removed from the casing, the spoil cleaned off the flights, and the auger reinserted into the casing. Thereupon the sand is introduced at the upper end of the casing and flows downwardly past and around the flights of the auger and fills the casing. When this has been accomplished the auger is rotated in the reverse direction which serves to force the sand downwardly to the bottom of the casing so that no voids are left. When the auger is to be removed from the casing, it is rotated at a reduced speed thereby causing the bit members to contract so that they will pass through the casing.

Further in accordance with my present invention I have provided another special form of casing which is so constructed as to facilitate sinking. This casing is provided with two or more vertical water conduits or pipes permanently secured as by welding, to the exterior surface of the casing, and arranged to deliver water under pressure to or near the bottom of the casing. The water serves to lubricate the casing during the sinking operation, and when it is desired to remove the casing, the water supply to the conduits is cut off and they are opened to the atmosphere at the surface of the ground. Thus as the casing is withdrawn any tendency to produce voids at or near the bottom of the casing is eliminated so that the retarding influence of suction which might otherwise occur is prevented.

Still another feature of my present invention is the provision of means for clearing the spoil from the flights of the auger after it has been withdrawn from the casing or from the hole. For this purpose a series of auger comb teeth in the form of rigid plates of steel or of other suitable material is arranged along one side of the guide rails or leads. These teeth are fixed to the leads in suitably spaced relation. When the auger has been withdrawn it is swung laterally against the teeth from its operative position so as to cause the teeth to penetrate between certain of the auger flights. The auger is then simultaneously raised and rotated, means being provided for maintaining the auger properly positioned with respect to these teeth so that the teeth dig out or effect the removal of the spoil, which falls below and is collected in a suitable chute.

In some instances it is desired, or even required, that the hole be sunk in the soil by a combination of the simultaneous use of a drilling tool and of water flowing out of the end of the casing where the drilling tool is located and upwardly around the sides of the casing to the surface of the ground. Some of the objectives of this method are to facilitate the drilling operation, prevent displacement of the in situ soil, and, where the soil includes layers of sand and layers of clay, to prevent the smearing of the edges of the layers of sand with clay. This smearing retards the draining of in situ water into the completed sand drain. By an additional feature of the invention an improved apparatus is provided by which this method of drilling and forming sand drains can be readily carried out.

The invention will be understood in greater detail by an examination of the accompanying drawings and the additional description in connection therewith.

In these drawings all of which are diagrammatic:

FIG. 1 is a view in elevation of a crawler crane in position on an area of soft soil which is shown in vertical section and with a number of sand drains installed, the guiding device or "leads" of the crane being upright;

FIG. 2 shows a completed sand drain in vertical section and drawn to a scale which is considerably larger than that of FIG. 1;

FIGS. 3–8 show apparatus for installing sand drains which includes a special form of casing and special pressure chamber to aid in sinking the casing;

FIG. 3 is a side elevation of the lower portion of a crane "leads" with one of the special casings in position therein;

FIG. 3A is a perspective view of a special form of weight for the pressure chamber;

FIG. 4 is a view similar to FIG. 3 with the casing partially sunk into the ground;

FIG. 5 shows the casing after it has been sunk to its final depth and ready to have the soil material or "spoil" removed from within it.

FIG. 6 is a view similar to FIG. 5 but with the casing in section and showing the removal of the spoil by means of an auger;

FIG. 7 shows the introduction of sand into the casing;

FIG. 7A is a detail sectional view taken on line 7A—7A of FIG. 5;

FIG. 8 is a view similar to FIG. 3 showing a modified form of the special casing withdrawn from the ground after installing a sand drain;

FIG. 8A is a view in horizontal section taken on line 8A—8A of FIG. 8;

FIG. 9 is a view similar to FIG. 1 but with parts in different positions;

FIGS. 10–14 are views showing apparatus for installing sand drains involving the use of an auger in a special manner and including an auger having a head of special construction;

FIG. 10 is a view in elevation of the lower portion of the crane "leads" with an auger latched to a pressure chamber and ready to be inserted in a casing which is resting on the surface of the ground ready to be sunk;

FIG. 10A is a fragmentary view of the lower portion of the auger with its head or bit in expanded position;

FIG. 10B is a view of FIG. 10A from the bottom;

FIG. 10C is a view showing the auger bit or head in collapsed position;

FIG. 11 is a view similar to FIG. 10, showing the auger within the casing and the auger head or bit expanded ready for the sinking operation;

FIG. 12 is a view similar to FIG. 11 but with the casing sunk and the spoil being removed;

FIG. 13 is a view similar to FIG. 7 showing the sand being delivered to the casing through the pressure chamber and being placed or forced into position by air pressure;

FIG. 14 is a view similar to FIG. 12 showing the delivery of sand past the auger which is rotating in the reversed direction to pack the sand and with the casing in process of being withdrawn leaving the sand drain in place;

FIG. 15 is a perspective view of the lower end portion of a second special form of casing;

FIGS. 16–23 illustrate leads equipped for operating an auger and auger motor either in the drilling position or in a position at one side of the leads for clearing the spoil from the auger flights;

FIG. 16 is a front view of such a leads looking from the left in FIG. 1;

FIG. 17 is a fragmentary view drawn to an enlarged scale showing the lower portion of the leads and auger as viewed from the right-hand FIG. 16;

FIG. 18 is a horizontal section taken on line 18—18 of FIG. 17 but drawn to a smaller scale;

FIG. 19 is a view of the upper portion of the leads shown in FIG. 16 drawn to a somewhat larger scale;

FIG. 20 is a view similar to FIG. 19 with parts shown in different positions;

FIG. 21 is a top view of the leads shown in FIGS. 19 and 20;

FIG. 22 is a horizontal section taken on line 22—22 of FIG. 19;

FIG. 23 is a view similar to FIG. 22 but with parts shown in different positions;

FIG. 29 is a view in elevation showing the apparatus for installing sand drains by a combination of flowing water and rotary drill;

FIG. 30 is a bottom view of the apparatus of FIG. 29 as indicated by line 30—30; and FIGS. 31–35 are vertical central sections of the greater portion of the apparatus shown in FIG. 29 illustrating the various steps of drilling a hole and installing the sand drain.

Figure 21:
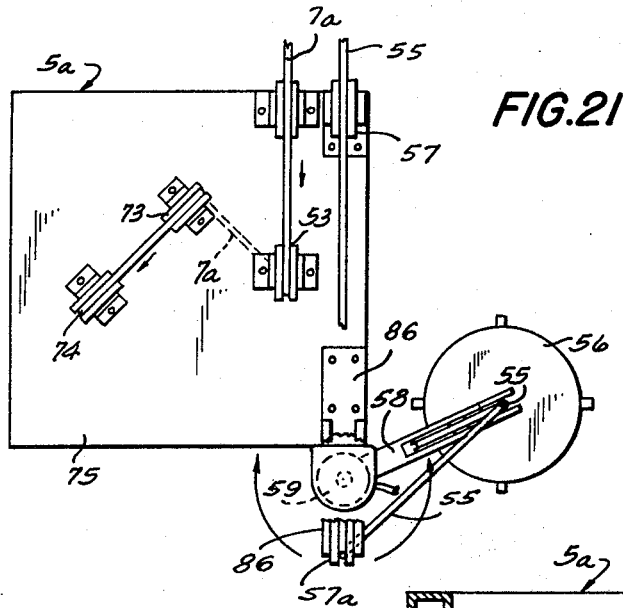

Referring first to FIGS. 1 and 2, FIG. 1 shows a vertical section through an area of soft soil composed of silt or muck and having a high water content, and in which sand drains 1 are being installed by a crawler crane 2 and its associated equipment to be described. Each sand drain consists of a column of sand S (FIG. 2) extending from the surface G of the soft ground to the firm ground 3 beneath.

Crawler crane 2 has a boom 4 pivoted to the outer end of which there is a "leads" 5. This is a long, rigid, open frame work steel structure having a pair of spaced, rigid guide rails 6 at its front or left side, between which various parts of the equipment are arranged to slide, being raised and lowered by means of a hoist line 7 operated by a conventional hoisting drum (not shown) within the crane structure. An auxiliary hoist line 8 also operated by the crane hoist is used to lower and raise a power driven auger and also to handle a sand skip or hopper 9, as will be later described.

One improved casing construction of the invention is shown at 10 in FIGS. 3, 4, 5, 6 and 7, and a modified construction is shown at 11 in FIGS. 8 and 8A. Casing 10 is a hollow cylindrical member open at both its lower and upper ends as shown in FIGS. 3 and 6 and made of steel of the usual gage or thickness for such casings. At its right side is shown in FIGS. 3–7 a length of wrought iron or steel pipe 12 welded to the outer surface of the casing lengthwise thereof. This pipe is curved at the top and provided with a connection (not shown) for an air hose 13.

Extending angularly upwardly through the wall of casing 10, which is shown in section in FIGS. 3 and 6, there are jet passages 14. Such passages extend through the casing wall and through the wall of pipe 12 so as to direct jets of fluid from the pipe upwardly at an angle to the axis of the casing. It will be understood that although only one jet pipe 12 has been illustrated, 2, 3 or more of these pipes may be provided if desired around the casing. Jet pipe 12 need not be welded continuously to the casing but only in the spaced areas 14a where the jet passages 14 are located.

In the modified form of casing shown in FIGS. 8 and 8A, instead of welding pipe to the casing, one or more conduits 15 are provided by means of steel sections, such as a section in the form of an angle bar welded to the casing. In FIGS. 8 and 8A two of these conduits 15 are provided in diametrically opposite locations. As shown in FIG. 8A, the corner of the angle bar, in each case, projects outwardly and the sides 16 are welded along their edges to the surface of the casing 11. Jet passages 14b similar to passages 14 extend angularly upwardly through the casing wall only. Each of the angle section fluid conduits 15 is closed at the bottom by weld metal, or otherwise, and at the top is a curved pipe section 17 welded thereto for connection to an air supply hose.

During the sinking of either of the forms of casing, that is, casing 10 of FIGS. 3–7, or casing 11 of FIGS. 8 and 8A, the lower end being open the soft soil material enters the casing. When sunk to the desired depth this soil material is removed, and the special casings have the advantage that this can be done simply by connecting the jet conduits 12 or 15 to a source of pressure fluid at 50 to 100 p.s.i. Air, water, or a combination of the two may be used. The jets produced by the jet passages 14 or 14a clear the casing of the spoil. The jets of fluid cause an upward movement of the soft material within the casing which flows out at the upper end and is conveyed away in any suitable manner.

In sinking the improved casings 10 or 11, a pressure chamber 18 may be mounted on or connected to the upper end of the casing. Pressure chamber 18, as shown in FIGS. 3 and 7 for example, is a hollow member of cast iron or other suitable metal having upwardly flaring sides in the form of an inverted truncated cone. The circular bottom of the pressure chamber is approximately the same diameter as the casing 10 or 11 with which it is to be used. An air tight joint of any suitable construction between these two surfaces is provided, and the pressure chamber is secured in detachable relationship to the end of the casing by means of a plurality of latch members 20. These are pivoted at their upper ends to the side of the pressure chamber, and their lower ends have latching formations which engage the lower surfaces of lugs 21 welded or otherwise secured to the casing.

Pressure chamber 18 has a flat cover member 22 (FIG. 7) which is either cast integrally with the sides of the chamber, or secured thereto in such a way as to form a tight closure. This member has an opening 23 and a door or gate 24 is arranged to close this opening from the inside. As shown, the door is pivoted at 25 to the inside of cover member 22 and urged toward closed position by means of a spring 26. If desired it may be latched in open position by means not shown.

Pressure chamber 18 is also provided with a valved connection 27 for a fluid pressure hose 28 (FIG. 3) usually an air hose.

Pressure chamber 18 is mounted on a guide frame or bar 29, the opposite ends of which are forked as shown at 30 in FIG. 7A to receive the guide rails 6 of the crane leads 5. When in use pressure chamber 18 is connected to the crane hoist line 7, by means of which it may be raised or lowered throughout the length of the leads.

When it is desired to sink one of the casings 10 or 11 the casing is placed in position between the rails 6, and pressure chamber 18 is lowered onto the upper end of the casing and latched thereto by the pivoted latches 20 as described. Then the boom 4 of the crane moves the leads 5 to bring the lower end of the casing into contact with the ground at a point where it is desired to install a sand drain. The leads 5 is now standing in upright position as shown in FIGS. 1 and 9 and the crane hoist is operated to lower the casing into the soft soil.

The weight of the casing itself plus the weight of the pressure chamber 18 usually causes the casing to penetrate the high water content silt or muck. After the casing has been worked some distance into this soil and resistance is encountered to further progress, the downward force can be increased by the addition of one or more of the special weights 31 shown in FIG. 3A to the top of pressure chamber 18. As shown in FIG. 3A, these weights are provided with an opening 32 which conforms approximately to the opening 23 in the top of the pressure chamber so as not to restrict such opening.

Under some circumstances it may be desirable to lubricate the outside of the casing by means of a jet pipe 19 (FIG. 4) from which a jet of water under suitable pressure is discharged at its lower end. This jet pipe is lowered alongside of the casing as the casing is worked into the ground.

Instead of using the jet pipe 19 the special form of casing shown at 10B in FIG. 15 may be employed. This casing is provided with one or more jet pipes 19a, two being shown, which are permanently secured to the exterior of the casing by welding or other suitable means. Water is supplied to the tops of pipes 19a by a hose and control valve (not shown), and is discharged near the bottom of the casing.

There are two advantages in using this special casing. During the sinking of the casing the water delivered by pipes 19a serves to soften the soil and to lubricate the surface of the casing so as to allow the casing to be sunk by its own weight, or possibly with the help of the pressure chamber 18 as previously described. When the casing is to be removed from the hole water may be discharged through pipes 19a to fill any voids that may develop and thus prevent suction from interfering with the withdrawal of the casing.

Where the soil produces greater resistance to the sinking of the casing than can be overcome by these methods, main hoist line 7 (FIG. 1) may be carried around a sheave 7a mounted near the lower end of the leads 5. In this way, instead of lifting the pressure chamber 18, the tension of the hoist line is utilized to apply a downward force to the pressure chamber and the upper end of casing 10 which serves to assist in working the casing into the soil.

After the lower end of the casing has been worked down to the firm ground 3 (FIGS. 1 and 2) the soil material within the casing is removed. As previously mentioned, this may be done by connecting an air hose 13 to the jet conduits 12 or 15, if either of the casings 10 or 11 is used, or it can be done by inserting an auger 34 (FIG. 6) and rotating the auger so as to discharge the spoil at the upper end of the casing. Also a combination of the air jets from conduits 12 or 15 and the rotating auger may be used. Further where the soil is sticky so that it adheres to the auger flights the auger may be hoisted out of the casing by hoist line 8 with or without simultaneous rotation, and the soil cleared from the auger flights as will be described later on.

Auger 34 is rotated by means of a power unit 35 from which it is suspended. This power unit is mounted upon a supporting frame 36 which is pivoted at 37 to a mount 38 arranged to slide on an auxiliary rail 39 extending along one corner of the leads 5. Power unit 35 and auger 34, when not in use, are lashed, or otherwise secured to leads 5 in an upper position on auxiliary rail 39 as shown in FIG. 1. When it is desired to use the auger, pressure chamber 18 is first raised by main hoist line 7 to a position at the upper part of the leads guide rails 6 so as to make way for the auger at the lower portion of the leads. Auxiliary hoist line 8 now lowers the sand skip 9 from the position shown in FIG. 1 and the skip is laid on the ground as shown in FIG. 9.

Auxiliary hoist line 8 is then attached to the power unit 35, and this unit and auger 34 are swung around the pivot 37 until the auger and power unit are within the leads and vertically over the casing in the ground, and hoist line 8 then lowers the assembly. A third hoist line (not shown) may be used in lieu of auxiliary line 8 to raise and lower power unit 35.

The power unit 35 may be operated hydraulically, pneumatically or electrically, as desired. As shown in FIG. 6 it is provided with a hydraulic pressure fluid supply hose 40 since a hydraulic motor is preferred.

After the casing has been cleared of the soil material it is ready for the introduction of the sand. This is shown in FIGS. 7, 13 and 14. Auger 34 and power unit 35 have been hoisted out of the casing by auxiliary hoist line 8 and swung to the outside of the leads 5 and secured in an upper position as is indicated diagrammatically in FIG. 1. Main hoist line 7 is used to lower pressure chamber 18 to be relatched to the top of casing 10 (FIG. 7). Also, auxiliary hoist line 8 is connected to the sand skip or hopper 9 and it is positioned to discharge sand through the opening 23 in the top of the pressure chamber. The flow of the sand causes the opening of the gate or door 24 and the sand proceeds downward into the casing.

Sand is delivered to the casing until the level is near the top. Should voids occur at the casing bottom door 24 (FIG. 7) may be closed and air pressure introduced through connection 27 to pack the sand. The air, under a pressure of about 100 p.s.i., causes the sand to move downwardly and fill up the voids. Any air contained in these voids can escape through air jet passages 14 into the air jet conduits 12 or 15, the hose connections at the tops of these conduits being removed. In addition, casing 10 may be raised gradually by main hoist line 7 as the sand is introduced so that the sand is forced out at the bottom of the casing to gradually fill the hole left by the withdrawal of the casing and produce a column of sand S as shown in FIG. 2.

Referring now to FIGS. 10–14 of the drawings there is shown apparatus for installing sand drains which does not require the use of air under pressure, either to clear the casing of the spoil or to place or force downwardly the sand out of the end of the casing as above described. This apparatus includes an auger with a special form of automatically expanding and contracting head or bit 41. The auger is operated by a special form of power unit 35a which is provided with an outwardly projecting flange at the top so that the pressure chamber 18 can be attached to the power unit and auger by means of the latch members 20.

In addition, power unit 35a is mounted on a frame structure 43 which can be removably attached to either of casings 10 or 11, or to a casing 10a as shown in FIGS. 10–14 which does not have air conduits, by means of latch members 20a pivoted to the lower portion of frame structure 43. Latch members 20a are similar to latch members 20 and engage the same lugs 21 which are welded on the outside of the casing and spaced somewhat from the top.

Frame structure 43 is supported in somewhat the same way as supporting frame 36 as shown in FIG. 6. That is to say, it is pivoted at 44 to a mount 45 which is arranged to slide on the auxiliary rail 39 at one corner of the leads 5. Thus, if desired, power unit 35a, frame structure 43 and auger 34b may be stored in an outward position similar to power unit 35 and auger 34 as shown in FIG. 1. When in use, however, the auger assembly is swung about pivot 44 into position between guides 6 of leads 5, and main hoist line 7 is operated to lower pressure chamber 18 so as to latch on to the power unit 35a, and then the entire assembly is lowered so as to place auger 34a within casing 10 (FIG. 11) with the auger head or bit 41 somewhat below the lower end of the casing, and latches 20a are engaged with lugs 21 as shown in FIG. 11.

Bit mechanism 41 is shown in diagrammatic detail in FIGS. 10A, 10B and 10C. It comprises a plurality of bit members 46, 4 being shown, which are pivoted at their inner ends at 47 to supports which are mounted at the lower end of the center post or core of auger 34a. These bit members are shown in extended or expanded position in FIGS. 10A and 10B, and in contracted and downwardly extended position in FIG. 10C, to which position they are biased by means of helical tension springs 48.

When auger 34a is stationary or is being operated at a speed somewhat lower than its drilling speed, the bit members 46 assume, by tension of springs 48, the positions shown in FIG. 10C or some angular position so that the tips of the bit members can be moved lengthwise within casing 10. When however, power unit 35a operates auger 34a at drilling speed, the rapid rotation causes bit members 46 to project radially outwardly as shown for example in FIG. 12. In this position, the tips of the bit members extend beyond the surface of casing 10a so that a hole is drilled in the soil through which the casing can easily descend. There are, of course, other types of expanding bits currently marketed that can be used in lieu hereof.

In placing sand drains with the apparatus just described, the auger 34a is operated as shown in FIG. 12 until casing 10 has descended to the firm ground 3, it being not necessary to use either the jet pipe 19, or a hoist line around sheave 7a to assist in sinking the casing. During this time the auger 34a is rotated in the right hand direction and the soil material which enters the lower end of the casing during the sinking operation, is raised by the auger to the surface of the ground and discharged on opposite sides of the frame structure 43 through the opposite openings 49 provided for this purpose (FIG. 12). After the casing has been sunk to the desired depth the casing is cleared of the spoil by rotation of auger 34a or by air, or otherwise, before or after removal of the auger. During this operation, the casing is prevented by hoist line 7 from descending farther into the ground. Advantageously, auger 34a is hoisted out of the casing, cleaned of the spoil adhering to its flights and then reinserted in the casing.

The sand may be introduced into the casing and placed or packed without the use of air pressure. This may be done by causing the sand skip 9 to discharge sand through one of the openings 49 as shown in FIG. 14, auger 34a being in position but either not rotating or rotating in the opposite direction and at a slow speed so that the bit members 46 hang downwardly as shown and do not interfere with the passage of the sand. The sand flows downwardly from the mouth of the skip 9 around the flight surfaces of auger 34a and between the auger and the inside wall of the casing.

The sand is placed or packed at the bottom of the casing by operating power unit 35a to rotate the auger 34a in the opposite or left hand direction. This prevents the formation of voids in the sand or eliminates them if they form. Both casing and auger are now removed leaving a column of sand. As the auger is rotated in the reverse direction the casing may be gradually raised by main hoist line 7, and the sand S discharged as a column from the lower end of the casing.

In case it should be desired to utilize air pressure for placing the sand at the bottom of the casing, instead of operating the auger in the reverse direction, the auger 34a may be removed from the casing and pressure chamber 18 latched on to the upper end of the casing as shown in FIG. 13. Then the spout of skip 9 may be brought into position to discharge sand into the casing through the pressure chamber as previously described in connection with FIG. 7. The sand is placed or packed at the bottom of the casing by the application of air pressure through the connection 27, also as already described.

In FIGS. 16–23 there is illustrated a modified form of leads 5a and associated parts together with an auger 34b by means of which the flights of the auger can quickly be cleared of the soil material or spoil after the auger is withdrawn from a hole or casing.

The leads 5a like leads 5 is an upright open steel framework comprising four steel channel members 50 forming the posts at the corners. Two of these channels members 50 at the front of the leads constitute stationary guide rails similar to guide rails 6 previously referred to. These four posts are interconnected by steel cross members 51 and braces 52 according to conventional construction. Braces 52 are omitted from FIGS. 19 and 20 for clarity. Main hoist line 7a operates over a sheave 53 and auxiliary hoist line 8 over a second sheave (not shown), both mounted at the top of leads 5a. The leads is connected near its upper end to the boom 4 as shown in FIGS. 1–9, but not shown in FIG. 16. By means of this boom the leads is supported and controlled by the mobile crawler crane 2.

Figure 22:
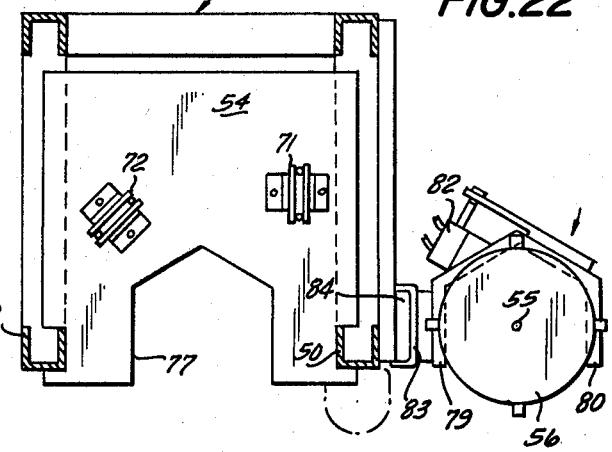
Figure 23:
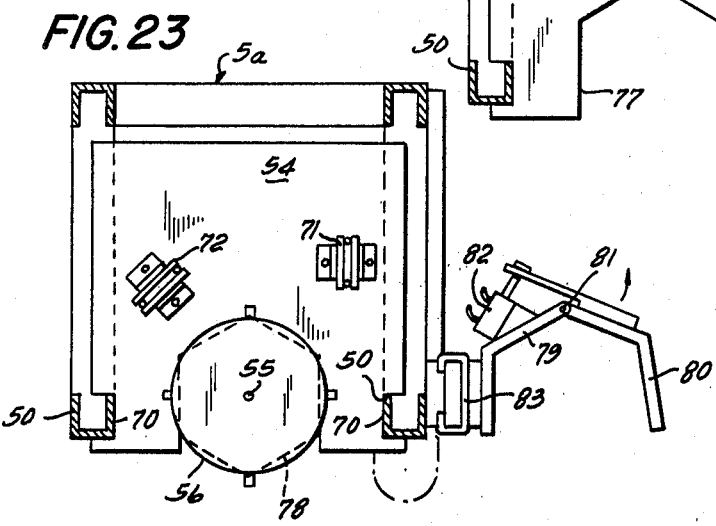

Main hoist line 7a is used to control a dolly 54 which supports the auger 34b and auger motor or power unit 56 when in the operating position between rails 50 as will be later described. Dolly 54 may also support casing 10a (FIG. 20) and has latches 20b for this purpose. Auxiliary hoist line 8a controls at certain times the sand hopper 9, and at other times the pressure chamber 18. A third hoist line 55 lowers and raises the augers 34b and the auger motor or power unit 56. Hoist line 55 passes over sheaves 57 and 57a on the cap of leads 5a (FIG. 21), and over sheave 57b which is carried by a short boom support 58 which has a special pivot mounting 59 near the top of leads 5a (FIG. 19). The location of mounting pivot 59 is at the corner of one of the upright posts 50 so that short boom 58 can be swung about this mounting through an angle of something more than 180° as indicated in FIGS. 21–23.

In order that line 55 may clear the corner of leads 5a during this swinging movement sheave 57a is mounted on a special bracket 86 which supports this sheave in front of and above the top of leads 5a (FIGS. 19–21).

Auger 34b has been moved by the swinging of boom 58 from its drilling position between the two posts or channel members 50 (FIG. 23) to a clearing position at the right hand side of leads 5a. Boom support 58 is caused to swing about its pivot 59 from the position shown in FIG. 20 to the position shown in FIGS. 19–22, and vice versa, by means of a reversible motor 58a which turns the boom support 58 through gearing enclosed within a gear box 58b. This motor may be operated electrically, hydraulically or otherwise.

Mounted on the adjacent post 50 of the leads are auger combs or teeth 60. These are stiff steel plates permanently fixed, as by welding, in vertically spaced position throughout most of the height of the leads. Advantageously these members 60 are spaced about 4 feet apart. As auger 34b is swung on short boom 58 from its operating (drilling) position (FIGS. 20 and 23) to the position shown in FIGS. 16–19, 21 and 22, the outer ends of comb members 60 enter between the helical flights of the auger and penetrate the spoil 61. In most soft soils when the auger is withdrawn the flights from end to end of the auger will be packed with a sticky and sometimes clayey material which is difficult to dislodge.

At suitably spaced intervals between the bottom and top of auger 34b clamping mechanisms 62 are placed. Each of these is mounted on a suitable support 63, welded or otherwise secured, to leads 5a. Pivotally mounted on supports 63 as indicated at 64 are two co-operating clamp members 65. These are operatively connected by means of a pair of links 66 to the piston rod 67 of a hydraulic cylinder 68. A suitable control valve (not shown) is arranged to control the admission and discharge of fluid under pressure to cylinder 68 so as to open and close the clamp members 65 in a well understood manner. As shown in FIGS. 16–18 clamp members 65 are in closed position and loosely surround the flights of auger 34b. The function of these clamps is to maintain the elongated auger in engagement with the comb members 60 during the cleaning operation.

The cleaning operation is carried out by simultaneously rotating auger 34b by means of power unit 56 and moving the auger lengthwise by means of hoist line 55 in a manner which will be described later on. This moves the spoil material against the flat faces of the several stationary comb members 60 thereby forcing the material from between the flights so that it falls vertically into a sloping chute 69 arranged beneath the auger at the cleaning position. The material discharged from the chute can be disposed of in any desired manner.

Dolly 54 is a small platform-like member which may occupy most of the space within the leads 5a and which is provided near its front edge with guideways 70 which cooperate with the two front posts 50 to guide the dolly in its movement up and down within the leads. Inasmuch as dolly 54 may support not only the auger 34b and auger motor 56, but also the casing such as casing 10a, it is connected with the main hoist line 70a by a "four part pull." For this purpose sheaves 71 and 72 are mounted in suitable brackets on the upper surface of the dolly, and sheaves 73 and 74 are mounted in brackets of the upper surface of cap member 75 at the top of leads 5a.

The main hoist line 7a is carried first over sheave 53 thence downwardly and around sheave 71 on dolly 54, thence upwardly and over sheaves 73 and 74 at the top of the leads, thence downwardly and around sheave 72 also on the dolly and upwardly to a connection 76 where the "becket end" of the line is fixed to the underside of cap 75. Extending inwardly from the front edge of dolly 54 there is a socket opening 77. This socket opening is semi-hexagonal in shape and is arranged to receive a hexagonal projection 78 on the lower end of auger motor 56.

Thus when the auger 34b and motor 56 are swung to the position shown in FIG. 20 which is the operating or drilling position, hexagonal projection 78 is received within socket opening 77 and when the motor is operated to turn the auger the motor casing is prevented from rotating and thus the torque produced by the auger is absorbed.

With motor 56 in position on the dolly 54 as shown in FIG. 20 both the motor and the auger are supported by the dolly since the marginal edges of the motor casing are larger than the hexagonal projection 78 and rest on the upper surface of the dolly (see FIGS. 20 and 23).

When the auger 34b and auger motor 56 are swung in the opposite direction by the operation of motor 58a to swing the boom 58 to the outer position (FIGS. 16, 17, 19 and 22), the hexagonal projection 78 of the motor is received within the jaws of a clamping device 79. Outer jaw 80 of this device is pivoted at 81 to the clamp structure and is operated to swing about this pivot by means of motor 82 to open and close the clamp. Such motor may be operated electrically or hydraulically and is operated to open jaw 80 as shown in FIG. 23 prior to swinging the auger motor and auger to the outer or cleaning position. Thereupon motor 82 is operated to close jaw 80 as shown in FIG. 22. Thus the auger motor is prevented from rotation when power is applied to cause the cleaning of the auger.

Clamping mechanism 79 is supported on a bracket which is arranged to slide on a vertical guide rail 84 secured to the side of leads 5a so as to enable the auger motor and auger to be raised by hoist cable 55 to bring all of the auger flights into engagement with comb members 60. When it is desired to clean the auger hoist line 55 is caused to raise the motor and auger, the motor bracket 79 sliding on rail 84 until the top of the rail is reached, line 55 then being paid off until the motor and its bracket have returned to the normal position at the bottom of rail 84.

In operating the sand drain apparatus shown in FIGS. 16–23, assuming that a casing such as 10a has been latched on to the dolly 54 by the latch members 20B (FIG. 20), and with the auger motor 56, with its auger 34b suspended within the casing let us assume that the lower end of casing 10a rests upon the ground. The auger 34b is provided with an expandable bit at its lower end similar to that described in connection with FIGS. 10A, B and C. The auger motor 56 is operated and a hole is drilled in the earth somewhat larger than the casing. As the drilling of the hole proceeds the casing is lowered into the hole by its own weight. The spoil produced by the operation of the auger is received within the casing and fills the auger flights.

The drilling is continued until dolly 54 reaches the ground when the casing is unlatched from members 20b. Then dolly 54 is raised by the operation of hoist line 7a, hoist line 55 being operated simultaneously, and motor 56, auger 34b and dolly 54 are raised until the dolly is nearly at the same level as the clamping device 79. If the dolly is stopped at a lower position, such as shown in FIG. 19, hoist line 55 is operated to raise auger motor 56 until its hexagonal projection 78 is on a level with the clamp 79. When they are at the same level, the motor 58a is operated to swing boom 58 and the auger motor and auger to the auger cleaning position. The auger is now in engagement with the comb members 60 as shown in FIG. 16, and clamping device 79 is closed on the auger motor. The motor is ready, as previously described, to rotate the auger, the spoil descending onto chute 69 of FIG. 16 from which it is delivered into a truck, or otherwise disposed of.

Casing 10a which was left in the ground may be filled with sand, whereupon dolly 54 is let down and relatched onto the casing. The clean auger 34b is now swung back to its operating position (FIG. 23) and dolly 54 is raised to lift the casing to its upper position surrounding the auger (FIG. 20) so that the parts are ready to repeat the cycle.

Figure 24:
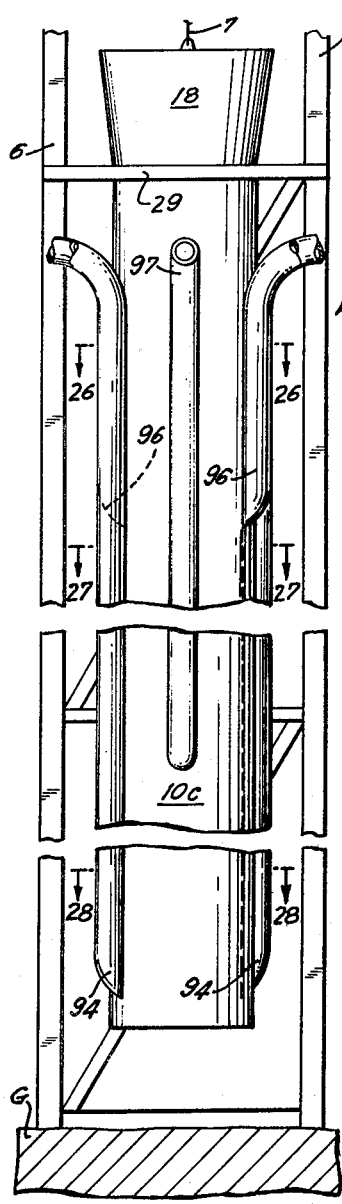
FIG. 24 is a view similar to FIG. 3 but illustrating a casing having a plurality of groups or sets of jets, each consisting of a continuous series of jets with independent or separate water supply conduits to each group.
Figure 25:
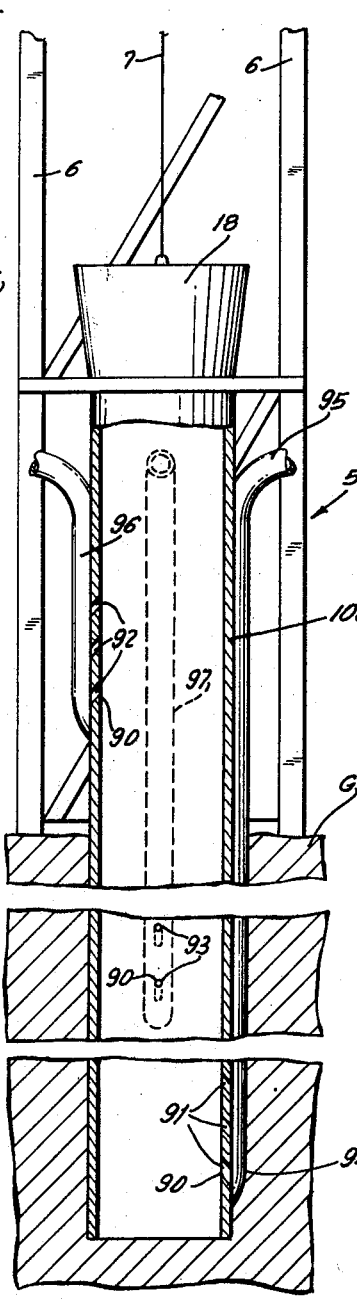
FIG. 25 is a view similar to FIG. 24 but showing the casing in central vertical section and with the casing extended into the ground.
Figure 26:
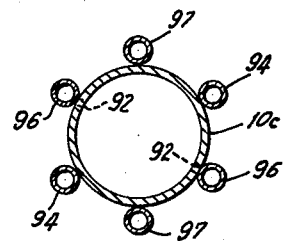
FIG. 26 is a cross section taken on line 26—26 of FIG. 24.
Figure 27:
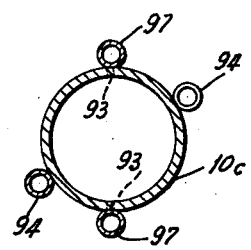
FIG. 27 is a similar section on line 27—27.
Figure 28:
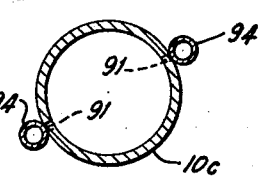
FIG. 28 is a similar section on line 28—28.
Figure 33:
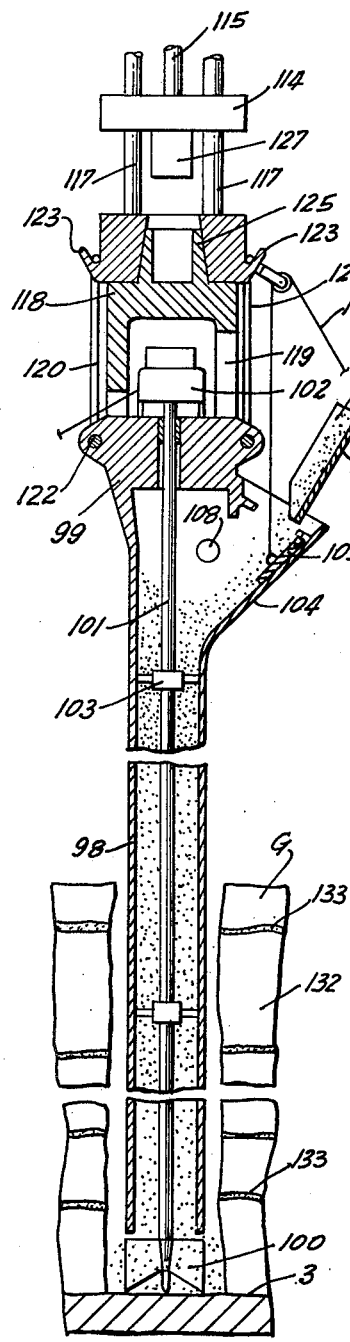
Figure 34:
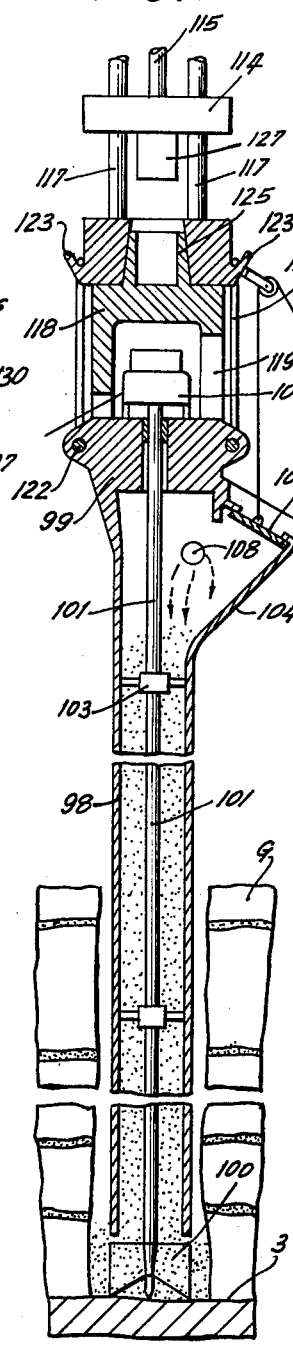
Figure 35:
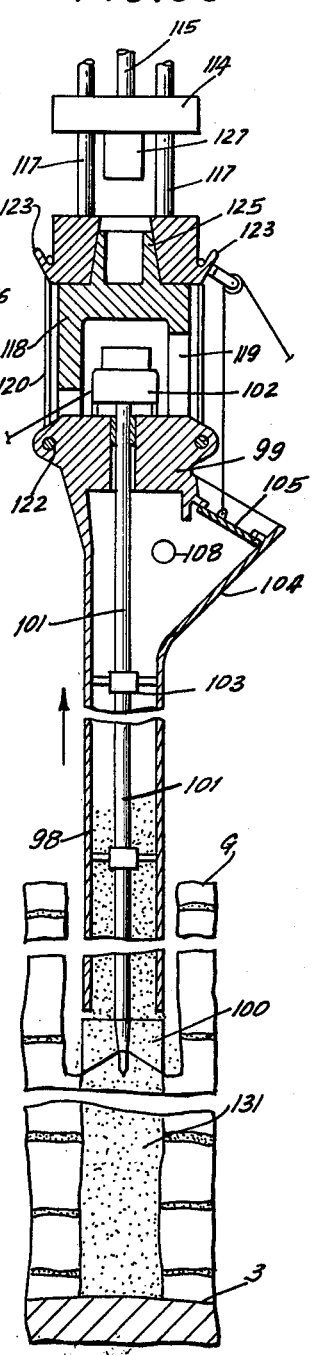

Referring now to FIGS. 24–28 a casing 10c similar to the casing 10 of FIG. 3 but having a different arrangement of the jet passages is illustrated. The jet passages 90 are similar to jet passages 14 but are arranged to separate groups or sets, each set comprising a continuous series of jets such as shown at 91, with similar jet passages directly opposite each other as indicated particularly in FIG. 28. As shown in FIGS. 24 and 25 a group 91 of these jet passages is shown close to the bottom of the casing 10c and a second similar group 92 is shown near the top of the casing, while a third group 93 is indicated as being located in the casing somewhere between groups 91 and 92. It will be understood that the number of these groups will depend upon the length of the casing, and it will also be understood that although three pairs of jet passages 90 have been shown in each of the three groups illustrated, a considerably larger number of pairs of passages can be included in each of the groups.

FIGS. 24 and 25 also show that each of the three groups 91, 92 and 93 of jet passages is supplied with fluid by means of separate piping or conduits. For example group 91 is supplied by two conduits 94 which are secured to the exterior surface of casing 10c by welding or otherwise. These two pipes 94 extend to the top of the casing where each is curved outwardly as shown at 95 in order to receive a fluid supply hose such as the hose 13 of FIG. 3.

The upper group 92 is supplied with jet fluid, air or water, or a combination thereof, by a second pair of pipes or conduits 96.

The third group or set 93 of jet passages is supplied with jet fluid through a third pair of pipes 97.

By providing the separate groups of jet passages just described a suitable valve (not shown) can be provided to direct the jet fluid first into the upper group, then into the middle group, or intermediate groups if there are more than one, and lastly into the lowest group 91. Thus the spoil will be removed in stages, first from the upper part of the casing, then from the middle section of the casing and lastly from the lowest section. It is advantageous but not necessary that the jet passages be arranged in pairs 180° apart from each other, but this arrangement is not critical, and the operation will be effective where the pairs of jet passages are generally but not precisely opposite each other, or even where the group consists of a continuous series of jets on one side only of the casing.

In FIGS. 29–35 my improved mandrel is illustrated by means of which it can be sunk into the soft soil by the combined action of a rotary cutter at its lower end and the action of water flowing downwardly through the mandrel and then upwardly around the outside of the mandrel.

FIG. 29 shows portions of the two guide rails 6 of a leads similar to leads 5 (FIG. 1) which is secured to the boom 4 of crawler crane 2. A mandrel 98 has a head portion 99 which is slotted at its opposite sides (FIG. 29) so as to be guided vertically between the rails 6.

Mandrel 98 is a tubular member which like casing 10 previously referred to has a diameter corresponding to that of the hole which it is desired to form. The mandrel is provided at its lower end with a cutter 100 in the form of two flat blades disposed 180° apart as shown in FIG. 30 and mounted at the lower end of a rotary shaft 101. These blades desirably have sharp edges as indicated and pointed lower corners as shown in FIG. 29. The driving shaft 101 extends centrally of the casing to the top thereof where it is connected to the driving shaft of a power unit 102 which is mounted on the head portion 99. Sealed bearings 103 for shaft 101 are supported on the interior of mandrel 98 at intervals throughout the length of the mandrel. Power unit 102 may be operated by any convenient form of power, electric, hydraulic or compressed air.

At the upper end of mandrel 98 just below head portion 99 a hopper 104 is provided having a hinged air-tight door 105 which may be opened and closed by means of a cable 106. When this door is open sand may be introduced into the hopper and mandrel by means of a sand skip 107 indicated in FIG. 33. Hopper 104 also has a flexible hose 108 which is connected to one side of the hopper. Hose 108 is connected through a three-way valve 109 to a source of compressed air through a pipe 110, and to a source of water through a pipe 111 from a pump 112. Both the air and water are supplied under a pressure of from 50 to 100 p.s.i.

Mandrel 98 is raised and lowered along the guide rails 6 of the leads by means of a conventional pile hammer 113 (FIG. 29) which is connected to the hoist line 7. Only a portion of the pile hammer is illustrated and, like the head portion 99 of the mandrel is arranged to slide along the guide rails 6. The pile hammer ram is indicated at 114 and is connected to the pile hammer by the usual piston rod 115. The pile hammer base 116 is connected to the pile hammer by means of 4 rigid columns 117, two of which can be seen in FIG. 29.

The head 99 of mandrel 98 is connected to base 116 by means of a special adapter 118, also arranged to be guided by rails 6. Adapter 118 is an integral hollow housing providing space within it for the power unit 102 which turns drill shaft 101 and having openings 119 for access to the power unit. The lower end of adapter 118 rests on the upper flat surface of mandrel head 99. The mandrel is connected to the pile hammer base 116 by means of a pair of pulling straps arranged on opposite sides of the hammer base and mandrel head. Each of these straps as shown consists of a steel cable having eye portions 121 at its opposite ends through which a removable pin 122 passes. Each pulling strap 120 is formed into a bight which is placed upon one of the hooks 123 formed integrally with and projecting from the opposite sides of pile hammer base 116. Thus when desired the mandrel 98 can be disconnected and removed from the pile hammer.

Pile hammer base 116 is formed with a central and downwardly flaring opening 124 into which a conical projection 125 on the top of the adapter 118 is fitted. Projection 125 has a cylindrical recess 126 to receive the nose 127 of the pile hammer ram 114, the downward impact of the ram being received by the bottom of recess 126. The impacting blows of the pile hammer are thus transmitted to mandrel 98 through the adapter 118. It will also be understood that if desired the pile hammer can be operated to disengage the mandrel from the drilled hole by means of upward strokes of hammer ram 114 against the bottom of the pile hammer body.

The operation of the apparatus in sinking a hole in the soft soil and installing a sand drain therein will be described in connection with FIGS. 31–35. It is to be noted that each of these figures is a vertical central section taken on line 31—31 of FIG. 29. It will be understood that the crawler crane 2 (FIG. 1) by means of boom 4, leads 5 and hoist line 7 swings pile hammer 113 and mandrel 98 over the location where a sand drain is to be installed. Power unit 102 is then started thus rotating shaft 101 and the blades of cutter or drill 100. Also water is introduced into the interior of the mandrel through three-way valve 109 under the desired pressure of from 0 to 100 p.s.i. or more, the mandrel airtight door 105 having been closed by means of cable 106. The mandrel is filled with water and as the mandrel is lowered by operating hoist line 7, drill 100 works its way into the soft ground G and the column of water 128 within the mandrel flows out of the lower end and between the cutting blades of the drill and then upwardly in a cylindrical column 129 (thickness exaggerated in the drawings) surrounding and close to the outer surface of the mandrel. The simultaneous action of the drill blades 100 and the flow of water out of the open bottom of the mandrel washes the hole and the mandrel is sunk into the ground.

The continuous upward flow of water outside of the mandrel as shown at 129 washes the soil upwardly to the surface of the ground G where the water and soil materials are disposed of in any convenient manner.

When a mandrel has been sunk to the desired depth as for example to the firm ground 3 (FIG. 32) the drill 100 is then stopped and the flow of water cut off. The door 105 in hopper 104 is opened and sand 130 introduced by means of the sand skip 107. According to this method the sand is introduced while the mandrel is full of water and the sand gradually sinks down to the bottom of the mandrel. After the mandrel has been filled with sand it may be withdrawn the sand flowing out of the bottom end of the mandrel and leaving a sand drain 131 (FIG. 35) in position. If desired, after the mandrel has been filled with sand door 105 may be closed and air pressure applied to aid in forcing the sand out of the casing.

Following another method however door 105 is kept closed. After the mandrel has been sunk to full depth the water supply is cut off and air is introduced through hose 108 into the mandrel at sufficient pressure, to force the water out of the mandrel whereupon the air pressure is quickly released by means of three-way valve 109, door 105 opened and sand introduced until the mandrel is filled. Then door 105 is reclosed and air pressure is again applied through hose 108 to cause the sand within the mandrel to be ejected from its bottom end past the blades of drill 100 and simultaneously the mandrel is raised by means of hoist line 7 leaving a column of sand 131 in the ground and extending to the surface.

In some instances, for example, where a particularly hard layer of ground is encountered it may be necessary to operate the pile hammer 113 to assist the cutter and the flow of water in sinking the mandrel through such a hard layer. The use of the pile hammer will occur when the frictional resistance of the soil exceeds the static weight of the mandrel and the parts resting thereon. This may also occur in pulling the mandrel out of the ground and if the pulling power of the equipment is insufficient to extract the mandrel, the pile hammer may be operated to assist in retracting the mandrel by causing the hammer ram to operate against the lower end of the pile hammer cylinder as previously referred to.

In FIGS. 31–35 the ground G is shown as being composed of layers of clay or silt such as indicated at 132, and intermediate thin layers 133 of sand. Where the hole is sunk into the ground without the use of water flowing upwardly around the outside of the mandrel or casing, the movement of the casing both in rotation and upwardly and downwardly is apt to smear the edges of the layers of sand 133 in contact with the surface of the casing or mandrel, with a thin layer or lens of clay.

This has the objection of greatly restricting the passage of water from the silt through the layers of sand into the completed sand drain. The aim of the procedure which employs the mandrel of the present invention and flows a column of water down through the mandrel and then upwardly around the outside of the casing in a cylindrical layer as shown at 129 is not only to prevent displacement of the original soil but also to prevent the smearing of the edges of layers 133 of sand with clay from the layers 132.

I claim:

1. In apparatus for installing nondisplacement sand drains in soft unstable soil, a tubular casing open at both ends and adapted to be sunk endwise into the soft soil so that the outer surface thereof will support the soil while sand is placed within the casing to form a sand drain, means for lowering the casing into the soft soil, the soil material at the bottom of the casing entering the casing during the sinking thereof, the casing having upwardly directed fluid jet passages through the wall of the casing, spaced apart in a continuous series lengthwise of the casing and means for supplying fluid under pressure simultaneously to said series of passages whereby the fluid discharged from the jet passages serves to clear the casing of the soil material therein.

2. Apparatus as set forth in claim 1 wherein the jet passages are arranged in a plurality of separate groups from the bottom to the top of the casing, the jet passages of each group being disposed some on one side and some on the opposite side of the casing, and wherein the means for supplying fluid under pressure comprises pairs of conduits secured to the exterior of the casing, said pairs of conduits being of different lengths, one pair supplying each group and one conduit of each pair supplying the jet passages on one side of the casing and the other conduit of each pair supplying the jet passages on the opposite side of the casing.

3. In apparatus for installing nondisplacement sand drains in soft unstable soil, a mobile crane having a hoist line and an upright steel framework including vertical guide rails, a pressure chamber member guided by the rails and suspended from the hoist line, a tubular casing open at both its lower and upper end, and releasable latching means for detachably connecting the pressure chamber member to the upper end of the casing, the hoist line being operated to bring the lower end of the casing into engagement with the soft soil, the weight of the pressure chamber member supplying force to assist the sinking of the casing in the soft soil, the pressure chamber member including an air-tight door in its roof portion, a connection for receiving air under pressure and a packed joint with the upper end of the casing, means for introducing sand through said door into the casing after the casing has been sunk to its final level, and means for thereafter supplying air under pressure through the pressure chamber to the casing to force the sand to the bottom thereof, the hoist line being operated to raise the casing during the application of air pressure.

4. In apparatus for installing nondisplacement sand drains in soft unstable soil, a mobile crane having an upright framework including vertical guide rails, and a hoist line, a tubular casing open at both ends and adapted to be sunk endwise into the soft soil, an auger having a power driving unit at its upper end, a pressure chamber member guided by the rails and suspended from the hoist line, and means for detachably connecting the pressure chamber member selectively to the upper end of the casing or to the power driving unit so that the casing may be first lowered and sunk into the soil by the pressure chamber member which thereafter is released from the casing and connected to the power driving unit to enable the auger to be inserted within the casing.

5. In apparatus for installing nondisplacement sand drains in soft unstable soil, a mobile crane having an upright steel framework including vertical guide rails and a hoist line, an auger having a power driving unit at its upper end, a frame structure for supporting the auger and power unit arranged to be guided vertically on one of said guides rails and including pivot means for swinging said frame structure from a position between the guide rails to a position at one side thereof, a pressure chamber member guided by said rails and suspended from the hoist line, means for detachably connecting the pressure chamber to the said frame structure thereby to raise or lower the auger and power unit.

6. Apparatus for installing nondisplacement sand drains as set forth in claim 5 wherein the said frame structure is provided with means for detachably connecting it to the upper end of the casing.

7. In apparatus for installing nondisplacement sand drains in soft and unstable soil, a tubular casing open at both ends, means for sinking the casing endwise into the soil the soil entering the bottom of the casing during sinking, and a jet pipe disposed outside of and separate from the casing for conveying water under suitable pressure to the lower end of the casing as the casing is worked into the ground, the jet pipe discharging the water outside of the casing where the soil enters the casing to facilitate the sinking of the casing into the soil.

8. Apparatus for installing nondisplacement sand drains as set forth in claim 7 in which the jet pipe is permanently secured to the exterior of the casing.

9. Apparatus for installing nondisplacement sand drains as set forth in claim 8 wherein a plurality of jet pipes are arranged in pairs around the exterior of the casing, one jet pipe of each pair being disposed on opposite sides of the casing.

10. In apparatus for installing nondisplacement sand drains, a tubular casing open at both ends, an auger within the casing and means for rotating the auger, the auger having a cutting head at its lower end having retractable wing cutters, these cutters in their extended position projecting radially beyond the outer surface of the casing so as to bore a hole larger than the casing and thus facilitate the sinking thereof, the cutters in their retracted position being of less diameter than the interior of the casing so as to permit removal of the auger, means for biasing said cutters to retracted position, the cutters being swung about their pivots to their said extended position by the rotation of the auger at drilling speed.

11. The method of installing sand drains in soft unstable soil which comprises providing a peripherally confined elongated upright hole of predetermined height and cross section downwardly into the soil, permitting soft soil surrounding the confined hole to enter the lower end of the peripherally confined upright hole as it is progressively formed, and passing jets of fluid under pressure spaced lengthwise of, and laterally into, said peripherally confined upright hole to cause soft soil within the confined upright hole to advance upwardly and be discharged from its upper end.

12. In apparatus for installing nondisplacement sand drains in soft unstable soil, a mobile crane having an upright steel framework including guide rails, an auger having a power drive unit at its upper end, a support for the auger and power unit pivotally mounted on the steel framework and arranged to swing the auger and power unit from an operating position with respect to the guide rails to a cleaning position at one side thereof, a plurality of auger comb members projecting in fixed vertically spaced relation from the side of the framework, means for maintaining the auger flights in engagement with the comb member while the power unit rotates the auger to cause the comb member to remove material adhering between the auger flights, and means for moving the auger lengthwise simultaneously with said rotation thereof.

13. Apparatus for installing nondisplacement sand drains as set forth in claim 12 wherein the means for maintaining the auger in cleaning relation to the comb members comprises at least two power operated clamping devices having jaws to open and surround at least two flights of the auger.

14. Apparatus for installing nondisplacement sand drains as set forth in claim 12 in which a releasable clamping device is arranged near the auger motor support for engaging the auger motor to prevent rotation and absorb the torque thereof during the operation of the motor for the removal of the material between the flights thereof.

15. Apparatus for installing nondisplacement sand drains in soft unstable soil as set forth in claim 12 in which at the operating position of the auger, means is provided for preventing rotation of the auger motor and absorbing the torque thereof during the operation of the auger.

16. In apparatus for installing nondisplacement sand drains in soft unstable soil, a mobile crane having main and auxiliary hoist lines and an upright framework including vertical guide rails, an auger having a power drive unit at its upper end, a dolly movable within the upright framework and arranged to be guided by the rails thereof, the main hoist line having suitable connections with the dolly for hoisting and lowering it within the framework, the dolly having means thereon for releasably supporting a tubular casing open at both its lower and upper ends, an auger support pivotally mounted on the steel framework, means for moving the support horizontally to swing the auger and power unit from an operating position between the guide rails to a cleaning position at one side thereof, the auxiliary hoist line being carried by the auger support and connected to the power drive unit and auger for lowering and raising the auger, means associated with the dolly for engaging the auger motor to prevent rotation and absorb the torque thereof when the auger and power unit are in operating position, a plurality of auger comb members projecting in fixed vertically spaced relation from the side of the steel framework arranged to enter between the flights of the auger when the auger motor and auger are swung to the cleaning position, means for engaging the auger motor to prevent rotation and absorb the torque thereof during the cleaning operation of the auger, the auxiliary hoist line being operated to raise the auger a predetermined limited distance and then lower it again so as to bring the comb members into cleaning position with respect to all of the auger flights, and releasable means for maintaining the auger flights in engagement with the comb members during the cleaning operation.

17. In apparatus for installing nondisplacement sand drains in soft unstable soil, a mobile crane having a hoist line and an upright steel framework including vertical guide rails, the improvement in combination therewith comprising a mandrel arranged to slide on said guide rails, said mandrel having a rotary drill at its lower end, a power unit at the uper end of the mandrel, a rotary driving shaft within the mandrel for interconnecting the power unit and drill, means for connecting the mandrel to the hoist line, the mandrel having near its upper end a sand-receiving hopper, an airtight door for the hopper, and means for supplying under pressure and at different times air or water to the upper end of the mandrel.

18. Apparatus for installing nondisplacement sand drains as set forth in claim 17 wherein the means for connecting the mandrel to the hoist line comprises a pile hammer having a ram and an adapter member between the pile hammer and the mandrel, said adapter surrounding the power unit for transmitting the impact of the pile hammer ram to the mandrel without affecting the power unit.

19. Apparatus for installing nondisplacement sand drains having means for supplying sand to the hopper and wherein the rotary drill at the lower end of the mandrel is provided with flat vertically arranged blades so as to allow the sand within the mandrel to pass from the lower end of the mandrel and form the sand drain as the mandrel is hoisted upwardly.

20. Apparatus for installing nondisplacement sand drains as set forth in claim 18 wherein the adapter member is an integral unit open at its lower end for the inclusion and removal of the power unit.

References Cited

UNITED STATES PATENTS

| | | | |
|---|---|---|---|
| 2,089,041 | 8/1937 | Smith | 61—63 |
| 2,518,591 | 8/1950 | Aston et al. | 175—215 |
| 2,784,942 | 3/1957 | Peck et al. | 175—171 |
| 2,849,213 | 8/1958 | Failing | 175—213 |
| 2,920,455 | 1/1960 | Ryser et al. | 61—53.64 |
| 3,174,562 | 3/1965 | Stow | 175—171 X |
| 3,255,592 | 6/1966 | Moor | 61—53.64 |
| 3,303,656 | 2/1967 | Landau | 61—35 X |

FOREIGN PATENTS 908,053 10/1962 Great Britain.

DAVID J. WILLIAMOWSKY, Primary Examiner

J. KARL BELL, Assistant Examiner

U.S. Cl. X.R.

175—135, 215